United States Patent
Fan et al.

(10) Patent No.: US 12,435,388 B2
(45) Date of Patent: Oct. 7, 2025

(54) METHOD FOR CO-PRODUCING BLISTER COPPER BY ENRICHING GERMANIUM AND INDIUM FROM A COPPER SULFIDE ORE

(71) Applicant: Honghe University, Honghe Hani and Yi Autonomous Prefecture (CN)

(72) Inventors: Xingxiang Fan, Honghe Hani and Yi Autonomous Prefecture (CN); Yan Jiang, Honghe Hani and Yi Autonomous Prefecture (CN); Na Wu, Honghe Hani and Yi Autonomous Prefecture (CN); Mengyang Huang, Honghe Hani and Yi Autonomous Prefecture (CN); Lida Sun, Honghe Hani and Yi Autonomous Prefecture (CN)

(73) Assignee: Honghe University, Honghe Hani and Yi Autonomous Prefecture (CN)

( * ) Notice: Subject to any disclaimer, the term of this patent is extended or adjusted under 35 U.S.C. 154(b) by 371 days.

(21) Appl. No.: 18/300,407

(22) Filed: Apr. 14, 2023

(65) Prior Publication Data

US 2024/0110259 A1    Apr. 4, 2024

(30) Foreign Application Priority Data

Oct. 1, 2022   (CN) .......................... 202211218243.3

(51) Int. Cl.
*C22B 5/10*     (2006.01)
*C22B 1/245*   (2006.01)
(Continued)

(52) U.S. Cl.
CPC ............... *C22B 5/10* (2013.01); *C22B 1/245* (2013.01); *C22B 15/0052* (2013.01); *C22B 41/00* (2013.01); *C22B 58/00* (2013.01)

(58) Field of Classification Search
None
See application file for complete search history.

(56) References Cited

U.S. PATENT DOCUMENTS 3,230,071 A *  1/1966  Marvin ..................... C22B 3/06
                                                                423/28
4,058,395 A    11/1977  Sole
                          (Continued)

FOREIGN PATENT DOCUMENTS

| CN | 110846511 A * | 2/2020 | ............. C22B 7/001 |
| CN | 113337725 A * | 9/2021 | ............. C22B 7/001 |
| WO | WO-2005005674 A1 * | 1/2005 | ............... C22B 5/16 |

*Primary Examiner* — Seth Dumbris
(74) *Attorney, Agent, or Firm* — True Shepherd LLC; Andrew C. Cheng

(57) ABSTRACT

A method for co-producing blister copper by enriching germanium and indium from a copper sulfide ore comprises: mixing a copper sulfide ore containing germanium and indium, a reducing agent and a fluxing agent in proportion and then grinding; subjecting the mixture to reduction matte smelting to obtain volatile smoke containing germanium and indium and copper matte respectively; subjecting the copper matte to oxygen-enriched blowing to volatilize germanium and indium, so as to obtain the blister copper and volatile smoke containing germanium and indium respectively; and oxidizing fumes discharged from bag dust collection by ozone, and then absorbing them by spraying alkali liquor to reach up-to-standard discharge. In the reduction smelting stage, the volatilization rate of germanium and indium is more than 70%; and in the copper matte oxygen-enriched blowing stage, the volatilization rate of germanium and indium is more than 25%.

5 Claims, 1 Drawing Sheet

(51) Int. Cl.
*C22B 15/00* (2006.01)
*C22B 41/00* (2006.01)
*C22B 58/00* (2006.01)

(56) References Cited

U.S. PATENT DOCUMENTS

| | | |
|---|---|---|
| 6,761,749 B1 | 7/2004 | Poijärvi et al. |
| 6,843,827 B2 | 1/2005 | Ojima et al. |
| 2015/0225812 A1* | 8/2015 | Akashi .................. C01D 17/00 422/162 |

* cited by examiner

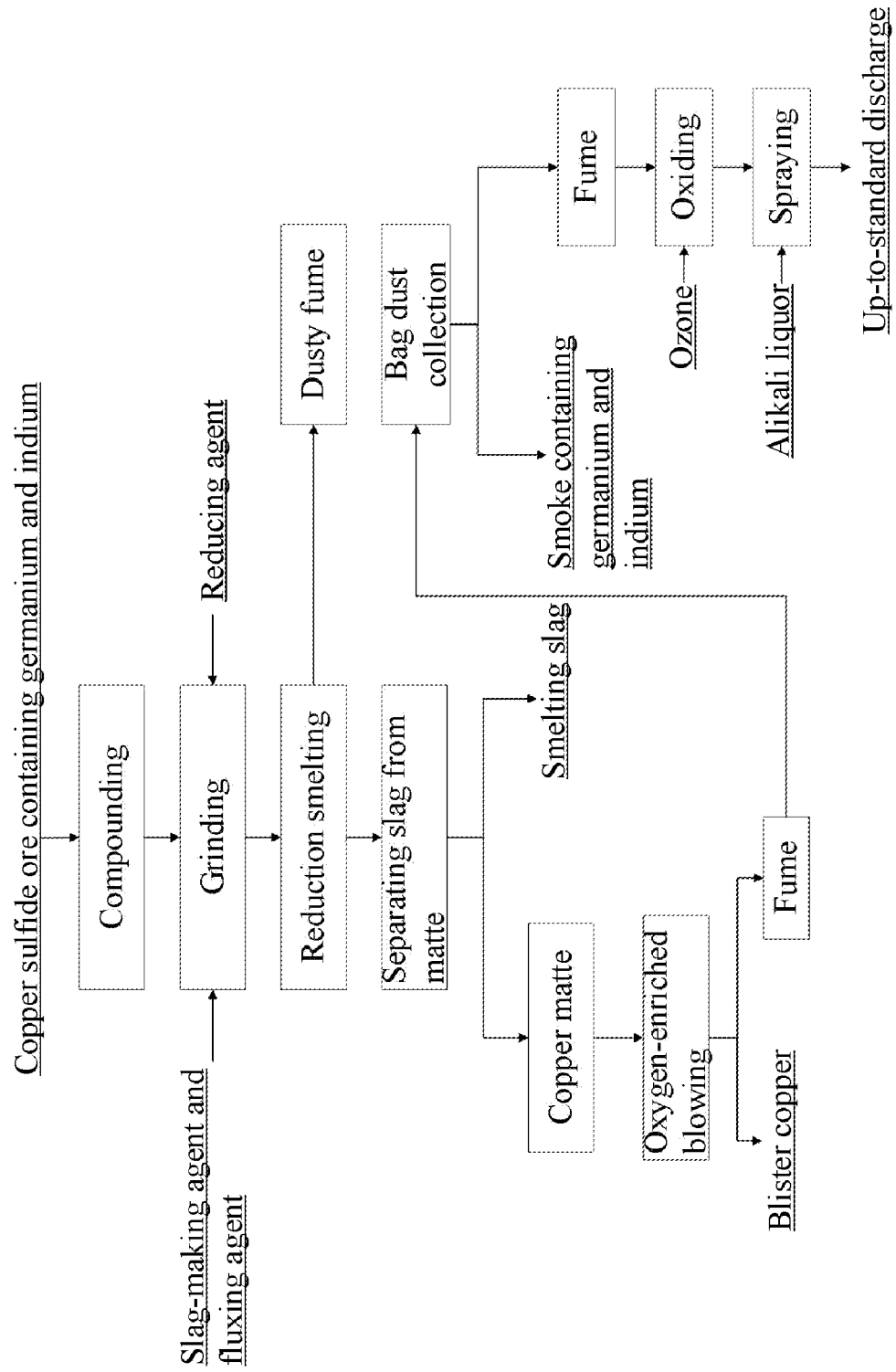

METHOD FOR CO-PRODUCING BLISTER COPPER BY ENRICHING GERMANIUM AND INDIUM FROM A COPPER SULFIDE ORE

CROSS-REFERENCE TO RELATED APPLICATIONS

This application claims priority to Chinese Patent Application No. 202211218243.3 with a filing date of Oct. 1, 2022. The content of the aforementioned applications, including any intervening amendments thereto, is incorporated herein by reference.

FIELD

The present disclosure belongs to the technical field of scattered metal recovery, and relates to a method for co-producing blister copper by enriching germanium and indium from a copper sulfide ore.

BACKGROUND

Germanium and indium are one of strategic metals, and an ore comprising them is a typical polymetallic copper sulfide ore, which, in addition to copper, comprises lead and lead-zinc as the base metal and germanium and indium as the scattered metal, and is not suitable for direct copper smelting. When it is used for lead smelting, high-value germanium and indium are bound to scatter. At present, the treatment methods of materials containing germanium and indium are as follows:

The invention of Zhigiang Meng et al. relates to a method for extracting scattered metal indium and germanium by germanium slag (invention patent number: CN201510252678.3), and belongs to the technical field of chemical metallurgy. According to the method, the germanium slag obtained through hard zinc vacuum distillation is used as raw materials. The method comprises the steps of subjecting the germanium slag to ball milling to obtain ball milled materials; then, performing leaching with a sulfuric acid solution; subjecting the obtained leach slag to oxidizing roasting and crushing it into crushing materials; subjecting the crushing materials to chloridizing distillation; cooling gases obtained by the chloridizing distillation to obtain a crude germanium tetrachloride solution; subjecting the crude germanium tetrachloride solution to a primary extraction; filtering the obtained germanium tetrachloride solution through a separation column; subjecting the germanium tetrachloride solution obtained by filtering to a secondary extraction to obtain a refined germanium tetrachloride solution, and hydrolyzing the refined germanium tetrachloride solution into germanium dioxide and reducing germanium dioxide into germanium.

Jianxing Yang et al. have disclosed a method for recovering valuable metals from high-silicon low-germanium and low-indium zinc oxide soot (invention patent number: CN201610212115.6), which includes the steps of 1) primary leaching, 2) secondary leaching, 3) silicon purification and adsorption, 4) indium deposition through neutralization, and 5) germanium deposition through tannin. Through the simple and convenient method, purification and removal of silicon and the adsorption performance of amorphous carbon are combined, so that full recycling of resources is achieved. Through the adsorbability of the amorphous carbon, the filtering performance in solid-liquid separation during silicon purification is well improved, an effective carrier is provided for suspended matter in a solution, and therefore filtrate is clear and free of suspended matter. By means of the method, the influence of silicon and suspended matter on indium and germanium deposition is eliminated, and the effects of burning heat generation and reduction of the added amorphous carbon can be played normally in the volatilization process of a rotary kiln. Under the conditions that the grade of indium and germanium in raw materials is low and the grade of silicon dioxide is high, interference of silicon and suspended matter is avoided, and germanium and indium are smoothly recovered.

Hongyang Cao et al. have invented a method for decomposing and leaching germanium and indium from lead and zinc alloy residues (application publication number: CN201210443998.3). The method includes the steps of leaching lead and zinc alloy residues with sulfuric acid for 2-6 h according to a liquid-solid ratio of the sulfuric acid to the lead and zinc alloy residues of 3-7:1, adding the lead and zinc alloy residues and adjusting the pH of the leaching liquid to 4.0-5.0, and filtering the mixture to obtain zinc leaching liquids and acid leaching dezinc residues; drying the acid leaching dezinc residues, milling and heating the acid leaching dezinc residues at the temperature of 300-800° C. to obtain oxidation alloy residues; placing the oxidation alloy residues which are subjected to preheating in a pressure kettle, adding sulfuric acid, feeding industrial oxygen, keeping pressure in the kettle to be 0.1-1.0 Mpa, performing primary acid pressure oxidative leaching and filtering to obtain primary leaching liquids and primary leaching residues; subjecting the primary leaching residues to secondary acid pressure oxidative leaching and filtering to obtain secondary leaching liquids and secondary leaching residues; and adding the secondary leaching liquid to the oxidation alloy residues for primary acid pressure oxidative leaching. The method for decomposing and leaching germanium and indium from lead and zinc alloy residues of the invention is short in technological process, economical and practical, environment-friendly in operation, and has a leaching rate of indium of 90-95% and a leaching rate of germanium of 92-98%. The method is applicable to vacuum furnace germanium residues containing a plurality of elements.

Shikun Pu et al. have disclosed a process method for recovering indium and germanium from indium concentrate (application publication number: CN201110347035.9), and the method includes the following steps: (1) oxidizing roasting: the indium concentrate is fully oxidized and roasted under the condition of 500-600° C. for 5-7 h to change the indium concentrate from black to yellow; (2) sulfuric acid oxidizing leaching: after the roasted indium concentrate is crushed to 120-200 mesh, industrial sulfuric acid in a weight of 15-30% by weight of the indium concentrate and sodium chlorate in a weight of 2-3% by weight of the indium concentrate are added thereto, the mixture is subjected to sulfuric acid oxidizing leaching at least once at a leaching temperature of 85-90° C. for a leaching time of 2-4 h, silver and lead are directly recovered from leaching residues since silver and lead are difficult to dissolve in sulfuric acid and adhere to leaching residues, and indium, germanium and zinc are recovered from the leaching solution; (3) indium recovery: the leaching solution obtained in the above step is first reduced with reduced iron powders to reduce ferric iron into ferrous iron, a sodium hydroxide solution is used for adjusting the acidity to 2-2.25 mol/L, and indium in the leaching solution is extracted with 1.5-2.5 mol/L m-diethylbenzene solution of P204 at a ratio of the organic phase:the leaching liquid phase of 1:2-3, so as to obtain a indium-rich extract and raffinate which is used for later use. The indium-rich extract is subjected to stripping by using a hydrochloric acid solution with a mass fraction of 15%, with a ratio of the indium-rich extract organic phase: the stripping agent phase of 5-6:1. The stripping solution is reduced with an aluminum plate to obtain crude indium, and then the crude indium is subjected to electrolytic impurity removal and purification to obtain refined indium; (4) germanium recovery: the raffinate in the above step is adjusted by using a sodium hydroxide solution with a mass percentage concentration of 40%, so as to achieve a pH value of 1.5-1.8, and then tannic acid which is 20-25 times the weight of germanium metal contained in the raffinate is added for precipitation and recovery, so that germanium is converted into tannic germanium slags and precipitated, and the filtrate is used for later use. After the germanium slag is filtered, washed and roasted, germanium concentrate is obtained, and the germanium concentrate is treated by traditional methods such as chloridizing distillation, redistilling, rectification and hydrolysis, high-purity germanium dioxide can be obtained; and (5) zinc recovery: the filtrate after germanium extraction in the above step is neutralized by first adding sodium carbonate solid until the pH value reaches 4.5-5.0, and then neutralized to the pH value of 6.5-7.0 by using a sodium hydroxide solution with a mass percentage concentration of 50%, allowing the zinc in the solution to be precipitated as zinc carbonate and recovered.

Shiping Li et al. have disclosed a method for extracting and separating germanium, indium and zinc from high iron, silicon and manganese materials containing germanium, indium and zinc (application publication number: CN201210043068.9), and the method includes the following steps of: firstly, performing neutral leaching with sulfuric acid to extract zinc under the condition of pH=5.2-5.4, subjecting neutral leaching residues to a primary acid leaching with sulfuric acid and one or more of ammonium fluoride, ammonium bifluoride, sodium fluoride and hydrogen fluoride under the condition of pH≤0.5, at the end of the primary acid leaching, adding sodium sulfite or zinc powders or iron filings to reduce ferric iron into ferrous iron, and adding a flocculant to remove free silicon; subjecting primary acid leaching residues to secondary acid leaching under the condition of pH≤0.5 by adding sulfuric acid and one or more of ammonium fluoride, ammonium bifluoride, sodium fluoride and hydrogen fluoride, and returning secondary acid leaching liquids to a primary acid leaching equipment; and extracting indium from the primary acid leaching liquid with P204, extracting germanium from the raffinate with N235 or precipitating germanium with tannin and/or tannin extract, and extracting indium from the organic phase by stripping. The temperature of each leaching step is 70±10° C.

Jun Gao et al. have disclosed a method for recovering indium and germanium from a zinc leaching residue (application publication number: CN201210198150.9). The method comprises the following steps of: leaching the zinc leaching residue containing indium and germanium by using sulfuric acid, after eliminating ferric iron and removing silicon, synergistically extracting indium and germanium by adding a hydroximic acid and P204 kerosene, extracting 99% of germanium and indium, and then carrying out stripping of germanium through ammonium fluoride and precipitating germanium by ammonia gas or ammonia water, carrying out stripping of indium through concentration and with hydrochloric acid, replacing indium with aluminum, and roasting germanium precipitation residues to obtain an indium ingot and germanium concentrate respectively. By using the method, germanium and indium can be extracted from a slag with a lower grade, with a simple procedure, easy operation and fewer discharged pollutants.

In summary, no literature in relation to the method for co-producing blister copper by enriching germanium and indium from a copper sulfide ore has been reported yet.

SUMMARY

The present disclosure aims to provide a method for co-producing blister copper by enriching germanium and indium from a copper sulfide ore.

According to the present disclosure, a copper sulfide ore containing germanium and indium, a reducing agent and a fluxing agent are mixed in proportion and then ground. Ground mixtures are subjected to reduction matte smelting to obtain volatile smoke containing germanium and indium and copper matte respectively. The copper matte is subjected to oxygen-enriched blowing to volatilize germanium and indium, so as to obtain blister copper and volatile smoke containing germanium and indium respectively. Fumes discharged from bag dust collection is oxidized by ozone, and then absorbed by spraying alkali liquor to reach up-to-standard discharge.

Further, in step (1), the reducing agent is selected from the group consisting of coke powder, anthracite and bituminous coal, a slag-making agent is quartz sand and calcium oxide, and the fluxing agent is borax, wherein the quartz sand is added in an amount of 10-25% by weight of the copper sulfide ore, calcium oxide is added in an amount of 15-20% by weight of the copper sulfide, the reducing agent is added in an amount of 3-10% by weight of the copper sulfide, and the fluxing agent is added in an amount of 10-25% by weight of the copper sulfide.

Further, in step (2), the copper matte is obtained by performing reduction smelting at a smelting temperature of 1250-1350° C. for a smelting time of 0.5-1.5 h.

Further, in step (3), the copper matte is subjected to oxygen-enriched blowing at a blowing temperature of 1300-1350° C. for a blowing time of 0.5-1.5 h and with an oxygen concentration in the blowing of 50-70%, to volatilize germanium and indium and to obtain the blister copper.

Further, in step (4), the fumes discharged from the bag dust collection are oxidized by ozone, and then absorbed by spraying alkali liquor to reach the up-to-standard discharge, and the ozone is used in an amount of 1.2-1.5 times of theoretical amount of reaction with sulfur dioxide, and the alkali liquor has a concentration of 10-30%.

The present disclosure has the following innovative points:

(1) by reduction matte smelting, more than 70% of volatilized germanium and indium are collected by bag dust collection, and 25% of germanium and indium are trapped in the copper matte;
(2) the copper matte is subjected to oxygen-enriched blowing to volatilize germanium and indium, which are collected by bag dust collection;
(3) the fumes discharged from bag dust collection are oxidized by ozone, and then absorbed by spraying alkali liquor to reach up-to-standard discharge; and
(4) the reduction matte smelting and oxygen-enriched blowing realize the enrichment of germanium and indium, and the fumes are oxidized by ozone and sprayed with alkali liquor, thus avoiding the problems of large reagent consumption, high cost, large amount of waste liquid, etc. occurred in germanium extraction and indium leaching by a whole wet method.

In summary, according to the present method, in the stage of the reduction smelting, the volatilization rate of germanium and indium is more than 70%; and in the stage of the copper matte oxygen-enriched blowing, the volatilization rate of germanium and indium is more than 25%. The volatilization rate of germanium and indium is more than 95% in the whole process, the enrichment ratio of germanium and indium in smoke is more than 30 times, and the copper content in blister copper is more than 97.0%. The method has the characteristics of short process flow, high yield and enrichment ratio of germanium and indium, environmental friendliness, etc., is mature in terms of the main smelting and dust collection equipment, and has a broad industrialization prospect.

BRIEF DESCRIPTION OF DRAWINGS

FIG. 1 is a process flow chart for co-producing blister copper by enriching germanium and indium from a copper sulfide ore.

DETAILED DESCRIPTION

In order to make the purposes, technical solutions and advantages of the present disclosure clearer, the present disclosure will be further described in detail below in conjunction with specific examples:

Example 1

As shown in FIG. 1, the conditions are as follows. 10 kg of a copper sulfide ore containing germanium was weighed, quartz sand was added in an amount of 10% by weight of the copper sulfide ore, calcium oxide was added in an amount of 15% by weight of the copper sulfide, a reducing agent was added in an amount of 5% by weight of the copper sulfide, and a fluxing agent was added in an amount of 15% by weight of the copper sulfide. The mixture was ball milled and compounded. Germanium was enriched by reduction matte smelting at a smelting temperature of 1300° C. for a smelting time of 1.0 h, to obtain volatile smoke containing germanium and indium and copper matte respectively. The copper matte was subjected to oxygen-enriched blowing at a blowing temperature of 1300° C. for a blowing time of 0.5 h and with an oxygen concentration in the blowing of 60%. Fumes discharged from bag dust collection were oxidized by ozone, and then absorbed by spraying alkali liquor, wherein the ozone was used in an amount of 1.2 times of theoretical amount of reaction with sulfur dioxide, and the alkali liquor has a concentration of 10%. In the stage of the reduction smelting, the volatilization rate of germanium and indium is 72.16%; and in the stage of the copper matte oxygen-enriched blowing, the volatilization rate of germanium and indium is 26.34%. The volatilization rate of germanium and indium reaches 98.46% in the whole process, the enrichment ratio of germanium and indium in smoke reaches 36.61 times, and the copper content in blister copper is 97.28%.

Example 2

As shown in FIG. 1, the conditions are as follows. 40 kg of a copper sulfide ore containing germanium was weighed, quartz sand was added in an amount of 20% by weight of the copper sulfide ore, calcium oxide was added in an amount of 15% by weight of the copper sulfide, a reducing agent was added in an amount of 5% by weight of the copper sulfide, and a fluxing agent was added in an amount of 25% by weight of the copper sulfide. The mixture was ball milled and compounded. Germanium was enriched by reduction matte smelting at a smelting temperature of 1280° C. for a smelting time of 1.5 h, to obtain volatile smoke containing germanium and indium and copper matte respectively. The copper matte was subjected to oxygen-enriched blowing at a blowing temperature of 1350° C. for a blowing time of 1.0 h and with an oxygen concentration in the blowing of 65%. Fumes discharged from bag dust collection were oxidized by ozone, and then absorbed by spraying alkali liquor, wherein the ozone was used in an amount of 1.5 times of theoretical amount of reaction with sulfur dioxide, and the alkali liquor has a concentration of 25%. In the stage of the reduction smelting, the volatilization rate of germanium and indium is 73.03%; and in the stage of the copper matte oxygen-enriched blowing, the volatilization rate of germanium and indium is 25.62%. The volatilization rate of germanium and indium reaches 98.65% in the whole process, the enrichment ratio of germanium and indium in smoke reaches 43.67 times, and the copper content in blister copper is 98.27%.

Example 3

As shown in FIG. 1, the conditions are as follows. 50 kg of a copper sulfide ore containing germanium was weighed, quartz sand was added in an amount of 25% by weight of the copper sulfide ore, calcium oxide was added in an amount of 16% by weight of the copper sulfide, a reducing agent was added in an amount of 6% by weight of the copper sulfide, and a fluxing agent was added in an amount of 20% by weight of the copper sulfide. The mixture was ball milled and compounded. Germanium was enriched by reduction matte smelting at a smelting temperature of 1350° C. for a smelting time of 0.5 h, to obtain volatile smoke containing germanium and indium and copper matte respectively. The copper matte was subjected to oxygen-enriched blowing at a blowing temperature of 1320° C. for a blowing time of 1.5 h and with an oxygen concentration in the blowing of 60%. Fumes discharged from bag dust collection were oxidized by ozone, and then absorbed by spraying alkali liquor, wherein the ozone was used in an amount of 1.4 times of theoretical amount of reaction with sulfur dioxide, and the alkali liquor has a concentration of 20%. In the stage of the reduction smelting, the volatilization rate of germanium and indium is 72.81%; and in the stage of copper matte oxygen-enriched blowing, the volatilization rate of germanium and indium is 25.11%. The volatilization rate of germanium and indium reaches 97.92% in the whole process, the enrichment ratio of germanium and indium in smoke reaches 38.81 times, and the copper content in blister copper is 98.05%.

Example 4

As shown in FIG. 1, the conditions are as follows. 30 kg of a copper sulfide ore containing germanium was weighed, quartz sand was added in an amount of 20% by weight of the copper sulfide ore, calcium oxide was added in an amount of 18% by weight of the copper sulfide, a reducing agent was added in an amount of 10% by weight of the copper sulfide, and a fluxing agent was added in an amount of 15% by weight of the copper sulfide. The mixture was ball milled and compounded. Germanium was enriched by reduction matte smelting at a smelting temperature of 1250° C. for a smelting time of 1.0 h, to obtain volatile smoke containing germanium and indium and copper matte respectively. The copper matte was subjected to oxygen-enriched blowing at a blowing temperature of 1300° C. for a blowing time of 1.0 h and with an oxygen concentration in the blowing of 70%. Fumes discharged from bag dust collection were oxidized by ozone, and then absorbed by spraying alkali liquor, wherein the ozone was used in an amount of 1.2 times of theoretical amount of reaction with sulfur dioxide, and the alkali liquor has a concentration of 15%. In the stage of the reduction smelting, the volatilization rate of germanium and indium is 72.18%; and in the stage of the copper matte oxygen-enriched blowing, the volatilization rate of germanium and indium is 26.59%. The volatilization rate of germanium and indium reaches 98.77% in the whole process, the enrichment ratio of germanium and indium in smoke reaches 44.87 times, and the copper content in blister copper is 98.26%.

Example 5

As shown in FIG. 1, the conditions are as follows. 20 kg of a copper sulfide ore containing germanium was weighed, quartz sand was added in an amount of 15% by weight of the copper sulfide ore, calcium oxide was added in an amount of 20% by weight of the copper sulfide, a reducing agent was added in an amount of 7% by weight of the copper sulfide, and a fluxing agent was added in an amount of 18% by weight of the copper sulfide. The mixture was ball milled and compounded. Germanium was enriched by reduction matte smelting at a smelting temperature of 1350° C. for a smelting time of 1.5 h, to obtain volatile smoke containing germanium and indium and copper matte respectively. The copper matte was subjected to oxygen-enriched blowing at a blowing temperature of 1320° C. for a blowing time of 1.5 h and with an oxygen concentration in the blowing of 65%. Fumes discharged from bag dust collection were oxidized by ozone, and then absorbed by spraying alkali liquor, wherein the ozone was used in an amount of 1.3 times of theoretical amount of reaction with sulfur dioxide, and the alkali liquor has a concentration of 20%. In the stage of the reduction smelting, the volatilization rate of germanium and indium is 72.65%; and in the stage of the copper matte oxygen-enriched blowing, the volatilization rate of germanium and indium is 26.51%. The volatilization rate of germanium and indium reaches 99.16% in the whole process, the enrichment ratio of germanium and indium in smoke reaches 40.63 times, and the copper content in blister copper is 98.01%.

What is claimed is:

1. A method for co-producing blister copper by enriching germanium and indium from a copper sulfide ore, comprising the steps of:
   (1) mixing a copper sulfide ore containing germanium and indium, a reducing agent and a fluxing agent in proportion, and grinding the resulting mixture;
   (2) subjecting the mixture to reduction matte smelting to obtain volatile smoke containing germanium and indium and copper matte respectively, and collecting the volatile smoke containing germanium and indium by a bag;
   (3) subjecting the copper matte to oxygen-enriched blowing to volatilize germanium and indium to obtain the blister copper and volatile smoke containing germanium and indium, respectively; and
   (4) oxidizing fumes discharged from bag dust collection by ozone, and absorbing them by spraying alkali liquor to reach up-to-standard discharge.

2. The method according to claim 1, wherein the reducing agent in step (1) is selected from the group consisting of coke powder, anthracite and bituminous coal, a slag-making agent is quartz sand and calcium oxide, and the fluxing agent is borax, the quartz sand is added in an amount of 10-25% by weight of the copper sulfide ore, calcium oxide is added in an amount of 15-20% by weight of the copper sulfide, the reducing agent is added in an amount of 3-10% by weight of the copper sulfide, and the fluxing agent is added in an amount of 10-25% by weight of the copper sulfide.

3. The method according to claim 1, wherein the copper matte in step (2) is obtained by performing reduction smelting at a smelting temperature of 1250-1350° C. for a smelting time of 0.5-1.5 h.

4. The method according to claim 1, wherein the copper matte in step (3) is subjected to oxygen-enriched blowing at a blowing temperature of 1300-1350° C. for a blowing time of 0.5-1.5 h and with an oxygen concentration in the blowing of 50-70%, to volatilize germanium and indium.

5. The method according to claim 1, wherein the ozone is used in an amount of 1.2-1.5 times of theoretical amount of reaction with sulfur dioxide, and the alkali liquor has a concentration of 10-30% in step (4).

* * * * *